(12) United States Patent
Khatri

(10) Patent No.: US 11,721,113 B2
(45) Date of Patent: Aug. 8, 2023

(54) VEHICULAR DRIVING ASSIST SYSTEM WITH LANE DETECTION USING REAR CAMERA

(71) Applicant: Magna Electronics Inc., Auburn Hills, MI (US)

(72) Inventor: Jaidev Khatri, Rochester Hills, MI (US)

(73) Assignee: Magna Electronics Inc., Auburn Hills, MI (US)

(*) Notice: Subject to any disclaimer, the term of this patent is extended or adjusted under 35 U.S.C. 154(b) by 0 days.

(21) Appl. No.: 17/450,082

(22) Filed: Oct. 6, 2021

(65) Prior Publication Data

US 2022/0114374 A1    Apr. 14, 2022

Related U.S. Application Data

(60) Provisional application No. 63/198,304, filed on Oct. 9, 2020.

(51) Int. Cl.
| | |
|---|---|
| *G06V 20/56* | (2022.01) |
| *G06T 7/73* | (2017.01) |
| *B62D 15/02* | (2006.01) |
| *G01S 19/45* | (2010.01) |
| *H04N 25/76* | (2023.01) |

(52) U.S. Cl.
CPC ......... *G06V 20/588* (2022.01); *B62D 15/025* (2013.01); *G01S 19/45* (2013.01); *G06T 7/73* (2017.01); *H04N 25/76* (2023.01); *G06T 2207/30256* (2013.01)

(58) Field of Classification Search
CPC .... G06V 20/588; B62D 15/025; G01S 19/45; G06T 7/73; G06T 2207/30256; G06T 2207/10016; G06T 2207/10024; G06T 2207/10028; G06T 2207/30196; G06T 7/70; H04N 5/374
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,285,393 B1 | 9/2001 | Shimoura et al. |
| 6,636,258 B2 | 10/2003 | Strumolo |
| 6,690,268 B2 | 2/2004 | Schofield et al. |
| 6,717,610 B1 | 4/2004 | Bos et al. |
| 6,882,287 B2 | 4/2005 | Schofield |
| 7,038,577 B2 | 5/2006 | Pawlicki et al. |
| 7,161,616 B1 | 1/2007 | Okamoto et al. |
| 7,308,341 B2 | 12/2007 | Schofield et al. |

(Continued)

*Primary Examiner* — Nam D Pham
(74) *Attorney, Agent, or Firm* — Honigman LLP

(57) ABSTRACT

A vehicular vision system includes a camera disposed at and viewing exterior and rearward of a vehicle. The system, as the vehicle is driven forward along a traffic lane of a road, and responsive to processing of image data captured by the camera, determines a traffic lane marker rearward of the vehicle. The system, responsive to determining the traffic lane marker, determines a position of the vehicle within the traffic lane the vehicle is moving along. The system, responsive to determining the position of the vehicle within the traffic lane is within a threshold distance of a side of the traffic lane, alerts an occupant of the vehicle.

20 Claims, 2 Drawing Sheets

(56) References Cited

U.S. PATENT DOCUMENTS

| | | |
|---|---|---|
| 7,338,177 B2 | 3/2008 | Lynam |
| 7,370,983 B2 | 5/2008 | DeWind et al. |
| 7,592,928 B2 | 9/2009 | Chinomi et al. |
| 7,598,887 B2 | 10/2009 | Sato et al. |
| 7,720,580 B2 | 5/2010 | Higgins-Luthman |
| 7,855,755 B2 | 12/2010 | Weller et al. |
| 8,098,173 B2 | 1/2012 | Hueppauff et al. |
| 8,285,479 B2 | 10/2012 | Kawabata et al. |
| 8,874,317 B2 | 10/2014 | Marczok et al. |
| 9,946,940 B2 | 4/2018 | Gupta et al. |
| 10,071,687 B2 | 9/2018 | Ihlenburg et al. |
| 10,078,892 B1 | 9/2018 | Wang et al. |
| 10,099,614 B2 | 10/2018 | Diessner |
| 10,106,155 B2 | 10/2018 | Lu et al. |
| 10,214,239 B2 | 2/2019 | Lee et al. |
| 10,583,779 B2 | 3/2020 | Koravadi |
| 2006/0050018 A1 | 3/2006 | Hutzel et al. |
| 2006/0061008 A1 | 3/2006 | Karner et al. |
| 2006/0136109 A1 | 6/2006 | Tanaka et al. |
| 2008/0140286 A1 | 6/2008 | Jung |
| 2010/0013670 A1 | 1/2010 | Hueppauff et al. |
| 2010/0049402 A1 | 2/2010 | Tanaka |
| 2010/0235053 A1 | 9/2010 | Iwakiri et al. |
| 2011/0144907 A1* | 6/2011 | Ishikawa ............... G01C 21/30 701/532 |
| 2011/0298639 A1 | 12/2011 | Kadowaki et al. |
| 2012/0154591 A1 | 6/2012 | Baur et al. |
| 2012/0162427 A1 | 6/2012 | Lynam |
| 2014/0022390 A1 | 1/2014 | Blank et al. |
| 2014/0160287 A1 | 6/2014 | Chen |
| 2015/0344028 A1 | 12/2015 | Gieseke et al. |
| 2016/0052516 A1* | 2/2016 | Kim ..................... B60Q 9/00 701/519 |
| 2016/0325682 A1 | 11/2016 | Gupta et al. |
| 2017/0015312 A1 | 1/2017 | Latotzki |
| 2017/0017847 A1 | 1/2017 | Nakaya |
| 2017/0017848 A1 | 1/2017 | Gupta et al. |
| 2017/0050672 A1 | 2/2017 | Gieseke et al. |
| 2017/0253237 A1 | 9/2017 | Diessner |
| 2017/0317748 A1 | 11/2017 | Krapf |
| 2017/0327037 A1 | 11/2017 | Prakah-Asante et al. |
| 2017/0329346 A1 | 11/2017 | Latotzki |
| 2018/0022347 A1 | 1/2018 | Myers et al. |
| 2018/0025234 A1 | 1/2018 | Myers et al. |
| 2018/0178726 A1 | 6/2018 | Timoneda et al. |
| 2019/0073541 A1 | 3/2019 | Koravadi |
| 2019/0084618 A1 | 3/2019 | Numata |
| 2019/0111845 A1 | 4/2019 | Karas |
| 2019/0270410 A1 | 9/2019 | Baur et al. |
| 2019/0275941 A1 | 9/2019 | Lu et al. |
| 2020/0027344 A1* | 1/2020 | Gerges ................. G07B 15/06 |
| 2020/0114933 A1* | 4/2020 | Ono ............... B60W 30/18009 |
| 2022/0189302 A1* | 6/2022 | Jiang ................ G08G 1/096791 |

\* cited by examiner

VEHICULAR DRIVING ASSIST SYSTEM WITH LANE DETECTION USING REAR CAMERA

CROSS REFERENCE TO RELATED APPLICATION

The present application claims the filing benefits of U.S. provisional application Ser. No. 63/198,304, filed Oct. 9, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provide a vehicular vision system that includes a camera disposed at a vehicle equipped with the vehicular vision system and viewing exterior and rearward of the vehicle and capturing image data. The camera includes a CMOS imaging array (e.g., with photosensors arranged in rows and columns). The system includes an electronic control unit (ECU) with electronic circuitry and associated software. The electronic circuitry of the ECU includes an image processor for processing image data captured by the camera. The vehicular vision system, as the vehicle is driven forward along a traffic lane of a road, and responsive to processing by the image processor of image data captured by the camera, determines a traffic lane marker indicative of the traffic lane along which the vehicle is traveling. The vehicular vision system, as the vehicle is traveling along the traffic lane of the road, and responsive to determining the traffic lane marker rearward of the vehicle, determines a position of the vehicle within the traffic lane the vehicle is traveling along. The vehicular vision system, responsive to determining the position of the vehicle within the traffic lane is within a threshold distance of a side of the traffic lane, alerts an occupant of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
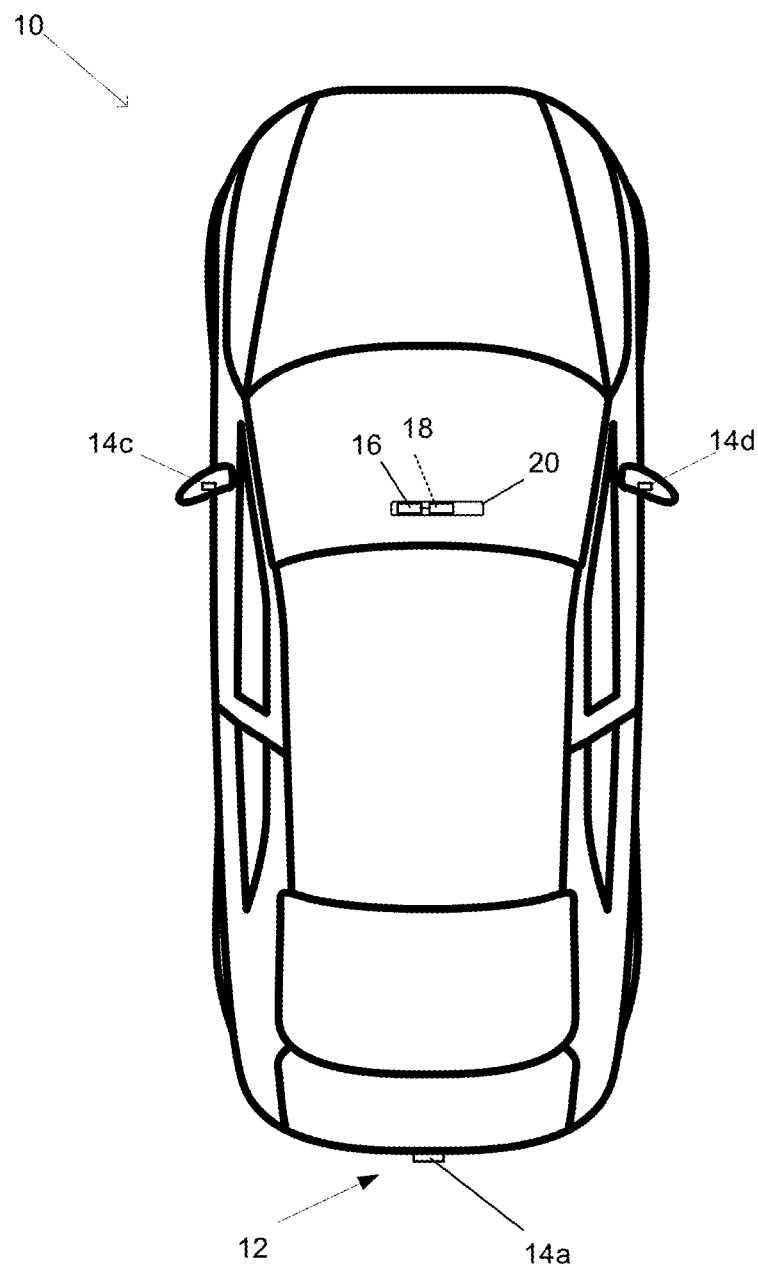
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a sideward/rearward viewing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Implementations herein describe a vehicular vision system/driving assist system that provides lane detection for the vehicle using a rear-view camera. The system obtains an input that may include data such as image data captured by a rearward viewing camera (such as a rear backup camera), vehicle speed, a current geographical location of the vehicle, and/or any relevant road/highway design requirements (e.g., National Highway Traffic Safety Administration (NHTSA) requirements). Based on the obtained data, the system performs lane detection of the traffic lane of the road the vehicle is traveling along and estimates the lane edges or markers ahead of the vehicle based at least in part on the image data captured by the rear backup camera. Thus, the system provides reliable and low cost forward lane detection without the need of a forward-viewing camera. The system may utilize aspects of the vision system described in U.S. Pat. No. 10,583,779, which is hereby incorporated herein by reference in its entirety.

Figure 2:
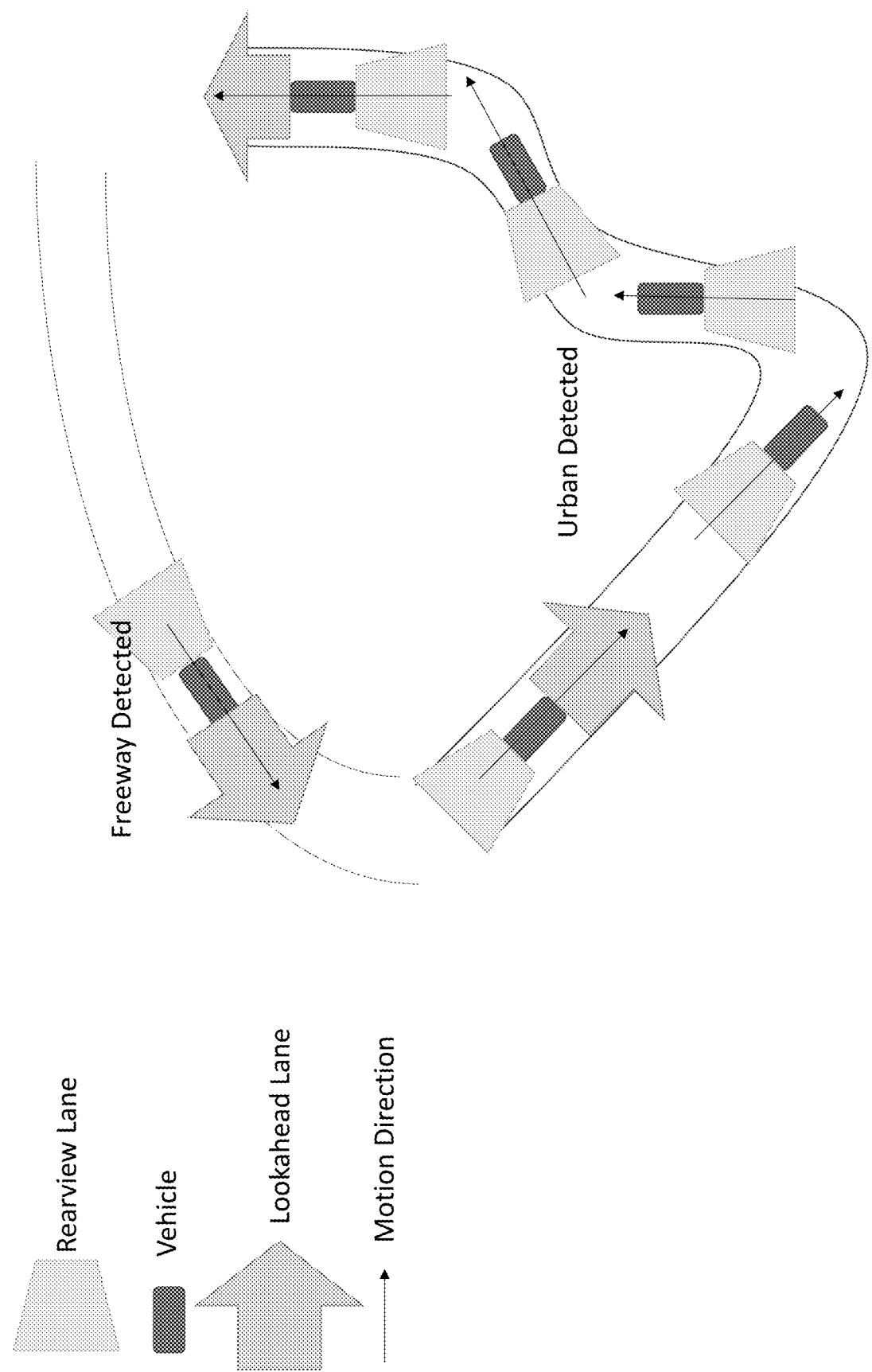
FIG. 2 is a schematic view of look ahead detection of the vision system of FIG. 1.

Referring now to FIG. 2, the system obtains image data captured by a rearward viewing camera. For example, the rearward viewing camera may be disposed at the rear of the vehicle (e.g., at or near a bumper or trunk of the vehicle) with a field of view that encompasses a portion of the road behind the vehicle (e.g., a rear backup camera of the vehicle). The ECU processes the captured image data to determine, for example, a lane width at the rear of the vehicle (e.g., via one or more lane markings) and average lane angles (e.g., curves, turns, etc.) for a set distance behind the vehicle (e.g., 100 meters, 500 meters, etc.) as the vehicle travels along a traffic lane of a road. Based on the lane width of the current lane and the average lane angle (to determine, for example, if the lane is curving or straight), the system determines a position of the vehicle within the traffic lane. The system may alert or warn an operator of the vehicle when the vehicle approaches or is at the side marker or edge of the traffic lane. Optionally, the system may correct steering of the vehicle to guide the vehicle back toward the center of the traffic lane. For example, when the vehicle drifts or moves within a threshold distance of an edge of the current traffic lane, the system may apply steering to maneuver the vehicle toward the center of the traffic lane.

The system may periodically store data regarding the route being traveled by the vehicle. For example, the system may periodically store images captured by the rear-viewing camera. Additionally or alternatively, the system may store parameters of the road or other features for future comparison to the then current road or road or environment features. For example, the system may store the lane width, curves, turns, grades, etc. The system may determine whether the vehicle has previously driven the same path using this stored data. For example, the system may compare current captured frames and/or road parameters to the previously stored data. When the system determines that the vehicle has previously driven the same path (e.g., based on the comparison of current and historical data), the system may accurately determine upcoming lane widths and angles (i.e., turns and curves) based on the previously stored data. For example, after the system determines that current data matches previously stored data, the system may "look ahead" using the stored data to determine upcoming turns, lane changes, etc. Thus, even without an accurate geographical location obtained by a GPS sensor or a front facing camera, the system may provide lane departure warnings or steering based on the knowledge of the upcoming roadway and the current image data captured by the rear-facing camera as the vehicle again travels along the previously traveled route.

The system may also obtain a current vehicle speed (e.g., from a vehicle speed sensor such an accelerometer, a global navigation system (GPS) sensor, a tire rotation sensor, etc.). The system may determine an average vehicle speed over a most recent distance (e.g., for the last 500 meters the vehicle has traveled). Based at least in part on the speed of the vehicle and/or the average speed of the vehicle, the system may determine whether the vehicle is currently traveling on a highway/freeway or in an urban environment. For example, high rates of speed are more likely to indicate freeway travel. While low speeds and/or frequent starts and stops may indicate urban travel. The system may also base this decision at least in part on the previously stored data or current lane widths and lane features.

When the system determines that the vehicle is traveling along a freeway (or other road type), the system may access (e.g., from a database or lookup table stored at the vehicle or via accessing the Internet via wireless communication) road construction requirements for the road type being traveled. For example, the system may determine maximum rates for turns, maximum and minimum lane widths, etc. for the road and traffic lanes along which the vehicle is traveling. In such a scenario, the system may have a high degree of confidence in the lane keeping function. When the system determines that the vehicle is traveling on some road types (e.g., city driving), the system may not perform lane keeping functions due to noisy data or otherwise may have a lower confidence in predicting the lane markers ahead of the vehicle and in the lane keeping function.

The system may also obtain a current geographical location of the vehicle from, for example, a GPS sensor. When the geographical location of the vehicle is available via GPS, the location may add additional confidence for the system. For example, the system may accurately predict upcoming road features (e.g., curves) based on the current geographical location and stored maps or map data and adjust the lane keeping function accordingly. The system may verify, via the current geographical location, that the vehicle previously traveled and recorded this route. The system may opt to not record routes that are known to be previously traveled (and thus already recorded). The system may opt to cross-check current data with past historical data (of the same route) to further increase confidence and/or update the past historical data based on changes to the road (e.g., road construction).

The confidence of the system may further increase when the route has been previously traveled. Activation of the system (i.e., use of the lane keeping functions) may be dependent upon a current confidence of the system. For example, the system may only provide certain lane keeping functions (e.g., steering and/or lane keeping) when the system exceeds a threshold confidence. The system may warn or alert an occupant of the vehicle when the system exceeds or fails to exceed the threshold confidence level. The system may disengage one or more functions (e.g., lane keeping) when the confidence level drops below the threshold level.

Thus, the system provides reduced cost and reliable look ahead detection or other lane keeping functions without the need of a forward viewing camera. The system provides the lane marker prediction using image data captured by the vehicle's rear backup camera, which is a standard feature on vehicles today. The system may operate without a GPS sensor or may operate with a GPS sensor for additional confidence. The system may record data regarding routes previously travel (e.g., frames of image data, road widths, turns, etc.) and compare current data to historical data to determine upcoming road features with or without the use of GPS.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a camera disposed at a vehicle equipped with the vehicular vision system and viewing exterior and rearward of the vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera;
   wherein the vehicular vision system, as the vehicle is driven forward along a traffic lane of a road, and responsive to processing by the image processor of image data captured by the camera, determines a traffic lane marker indicative of the traffic lane along which the vehicle is traveling;
   wherein the vehicular vision system, as the vehicle is traveling along the traffic lane of the road, and responsive to determining the traffic lane marker rearward of the vehicle, determines a position of the vehicle within the traffic lane the vehicle is traveling along;
   wherein the vehicular vision system, as the vehicle is driven forward along the traffic lane of the road, and responsive to processing by the image processor of image data captured by the camera, determines average lane angles for a portion of the determined traffic lane marker, and wherein the vehicular vision system determines the position of the vehicle within the traffic lane the vehicle is traveling along based at least in part on the determined average lane angles; and
   wherein the vehicular vision system, responsive to determining the position of the vehicle within the traffic lane is within a threshold distance of a side of the traffic lane, alerts an occupant of the vehicle.

2. The vehicular vision system of claim 1, wherein the vehicular vision system, responsive to processing by the image processor of image data captured by the camera, stores road data of the traffic lane along which the vehicle is traveling, and wherein, during a future drive of the vehicle along the road, the vehicular vision system compares the stored road data to current road data to determine whether the vehicle has previously travelled along the traffic lane.

3. The vehicular vision system of claim 2, wherein the vehicular vision system, responsive to determining that the vehicle has previously travelled along the traffic lane, determines upcoming road features of the traffic lane the vehicle is traveling along based on the stored road data.

4. The vehicular vision system of claim 3, wherein the vehicular vision system determines the position of the vehicle within the traffic lane along which the vehicle is traveling based on the upcoming road features.

5. The vehicular vision system of claim 1, wherein the vehicular vision system determines a type of traffic lane along which the vehicle is traveling based at least in part on a determined speed of the vehicle as the vehicle is driven forward along the road.

6. The vehicular vision system of claim 5, wherein the type of traffic lane along which the vehicle is traveling comprises a highway.

7. The vehicular vision system of claim 6, wherein, responsive to determining that the traffic lane along which the vehicle is traveling is a highway, the vehicular vision system obtains characteristics of the traffic lane of the vehicle is traveling along, and wherein the vehicular vision system determines the position of the vehicle within the traffic lane based in part on the obtained characteristics.

8. The vehicular vision system of claim 5, wherein the vehicular vision system determines an average speed of the vehicle over a set distance as the vehicle travels long the traffic lane, and wherein the vehicular vision system determines the type of traffic lane along which the vehicle is traveling based at least in part on the average speed.

9. The vehicular vision system of claim 1, wherein the vehicular vision system, responsive to receiving GPS data from a GPS sensor disposed at the vehicle, determines a geographical location of the vehicle, and wherein the vehicular vision system, responsive to determining the geographical location of the vehicle, determines the position of the vehicle along the traffic lane based in part on the geographical location.

10. The vehicular vision system of claim 1, wherein the vehicular vision system, responsive to determining the position of the vehicle within the traffic lane, determines a confidence level associated with the determined position, and wherein the vehicular vision system, when the confidence level is below a threshold confidence level, alerts the occupant of the vehicle.

11. The vehicular vision system of claim 10, wherein the vehicular vision system disables at least one driver assist function when the confidence level is below the threshold confidence level.

12. The vehicular visions system claim 1, wherein the vehicular vision system, responsive to determining the position of the vehicle within the traffic lane is within the threshold distance of the side of the traffic lane, controls steering of the vehicle.

13. The vehicular vision system of claim 1, wherein the vehicular vision system, as the vehicle is driven forward along the traffic lane of the road, and responsive to processing by the image processor of image data captured by the camera, determines a lane width of the traffic lane along which the vehicle is traveling, and wherein the vehicular vision system determines the position of the vehicle within the traffic lane the vehicle is traveling along based at least in part on the determined lane width.

14. The vehicular vision system of claim 1, wherein the camera comprises a rear backup camera of the vehicle.

15. A vehicular vision system, the vehicular vision system comprising:
a camera disposed at a vehicle equipped with the vehicular vision system and viewing exterior and rearward of the vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera;
wherein the vehicular vision system, as the vehicle is driven forward along a traffic lane of a road, and responsive to processing by the image processor of image data captured by the camera, determines a traffic lane marker indicative of the traffic lane along which the vehicle is traveling;
wherein the vehicular vision system, as the vehicle is traveling along the traffic lane of the road, and responsive to determining the traffic lane marker rearward of the vehicle, determines a position of the vehicle within the traffic lane the vehicle is traveling along;
wherein the vehicular vision system, responsive to processing by the image processor of image data captured by the camera, stores road data of the traffic lane along which the vehicle is traveling, and wherein, during a future drive of the vehicle along the road, the vehicular vision system compares the stored road data to current road data to determine whether the vehicle has previously travelled along the traffic lane;
wherein the vehicular vision system, responsive to determining that the vehicle has previously travelled along the traffic lane, determines upcoming road features of the traffic lane the vehicle is traveling along based on the stored road data;
wherein the upcoming road features comprise at least one selected from the group consisting of (i) a lane width of the traffic lane the vehicle is traveling along and (ii) lane angles of the determined traffic lane marker of the traffic lane along which the vehicle is traveling; and
wherein the vehicular vision system, responsive to determining the position of the vehicle within the traffic lane is within a threshold distance of a side of the traffic lane, alerts an occupant of the vehicle.

16. A vehicular vision system, the vehicular vision system comprising:
a rear backup camera disposed at a vehicle equipped with the vehicular vision system and viewing exterior and rearward of the vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera;
wherein the vehicular vision system, as the vehicle is driven forward along a traffic lane of a road, and responsive to processing by the image processor of image data captured by the camera, determines a first traffic lane marker indicative of a first boundary and a second traffic lane marker indicative of a second boundary of the traffic lane along which the vehicle is traveling;
wherein the vehicular vision system, as the vehicle is traveling along the traffic lane of the road, and responsive to determining the first traffic lane marker and the second traffic lane marker rearward of the vehicle, determines a position of the vehicle within the traffic lane the vehicle is traveling along;
wherein the vehicular vision system, as the vehicle is driven forward along the traffic lane of the road, and responsive to processing by the image processor of image data captured by the camera, determines average lane angles for a portion of the determined traffic lane marker, and wherein the vehicular vision system determines the position of the vehicle within the traffic lane the vehicle is traveling along based at least in part on the determined average lane angles; and
wherein the vehicular vision system, responsive to determining the position of the vehicle within the traffic lane is within a threshold distance of a side of the traffic lane, alerts an occupant of the vehicle.

17. The vehicular vision system of claim 16, wherein the vehicular vision system, responsive to processing by the image processor of image data captured by the camera, stores road data of the traffic lane along which the vehicle is traveling, and wherein, during a future drive of the vehicle along the road, the vehicular vision system compares the stored road data to current road data to determine whether the vehicle has previously travelled along the traffic lane.

18. The vehicular vision system of claim 17, wherein the vehicular vision system, responsive to determining that the vehicle has previously travelled along the traffic lane, determines upcoming road features of the traffic lane the vehicle is traveling along based on the stored road data.

19. The vehicular vision system of claim 18, wherein the vehicular vision system determines the position of the vehicle within the traffic lane along which the vehicle is traveling based on the upcoming road features.

20. A vehicular vision system, the vehicular vision system comprising:

a camera disposed at a vehicle equipped with the vehicular vision system and viewing exterior and rearward of the vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera;

wherein the vehicular vision system, as the vehicle is driven forward along a traffic lane of a road, and responsive to processing by the image processor of image data captured by the camera, determines a traffic lane marker indicative of the traffic lane along which the vehicle is traveling;

wherein the vehicular vision system, as the vehicle is traveling along the traffic lane of the road, and responsive to determining the traffic lane marker rearward of the vehicle, determines a position of the vehicle within the traffic lane the vehicle is traveling along;

wherein the vehicular vision system determines upcoming road features of the traffic lane the vehicle is traveling along based on stored road radar derived from image data previously captured by the camera;

wherein the upcoming road features comprise at least one selected from the group consisting of (i) a lane width of the traffic lane the vehicle is traveling along and (ii) lane angles of the determined traffic lane marker of the traffic lane along which the vehicle is traveling; and wherein the vehicular vision system, responsive to determining the position of the vehicle within the traffic lane is within a threshold distance of a side of the traffic lane and responsive to determining the upcoming road features, alerts an occupant of the vehicle.

* * * * *